Jan. 24, 1967  D. DALIN  3,299,859
STEAM BOILER AND HOT WATER GENERATOR
Filed July 25, 1964  12 Sheets-Sheet 1

Inventor
David Dalin

Jan. 24, 1967 D. DALIN 3,299,859
STEAM BOILER AND HOT WATER GENERATOR
Filed July 25, 1964 12 Sheets-Sheet 6

Inventor
David Dalin
By Ira Milton Jones
Attorney

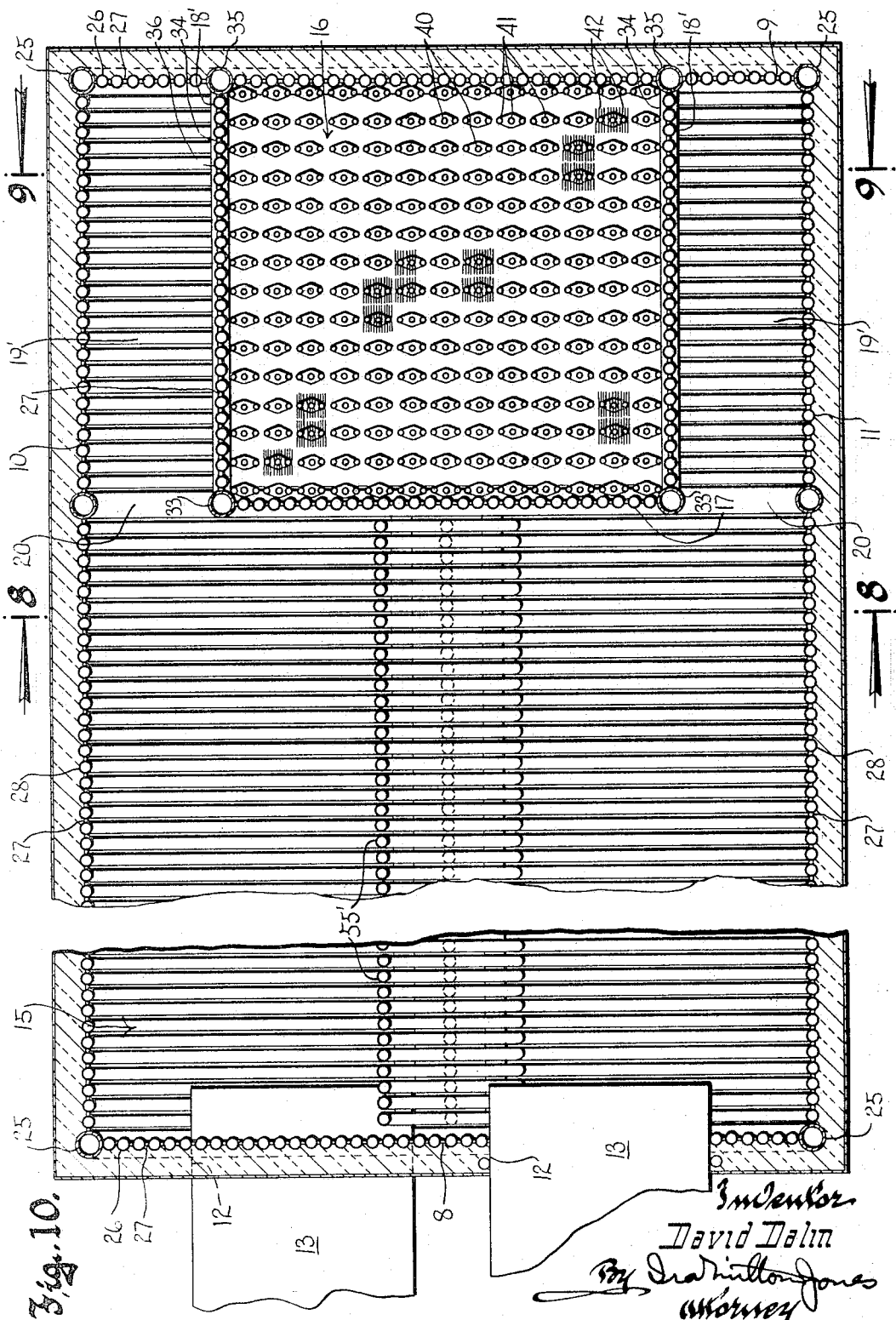

Jan. 24, 1967 D. DALIN 3,299,859
STEAM BOILER AND HOT WATER GENERATOR
Filed July 25, 1964 12 Sheets-Sheet 10
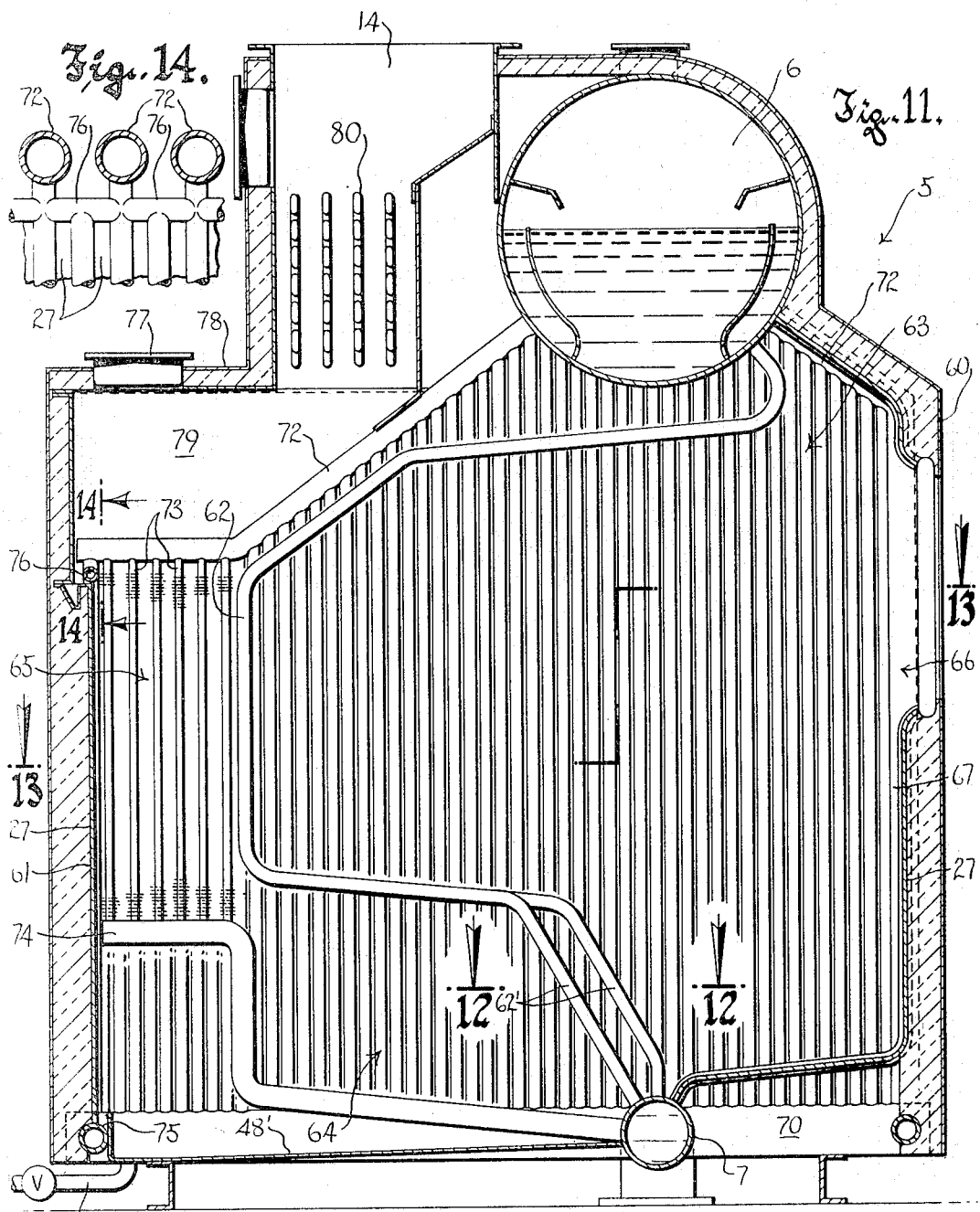
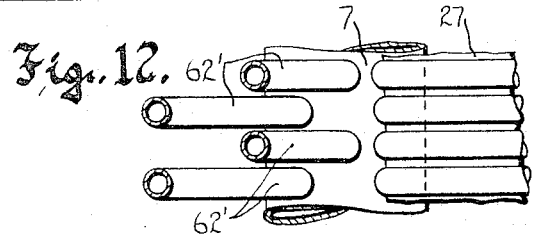
Inventor
David Dalin
By [signature]
Attorney

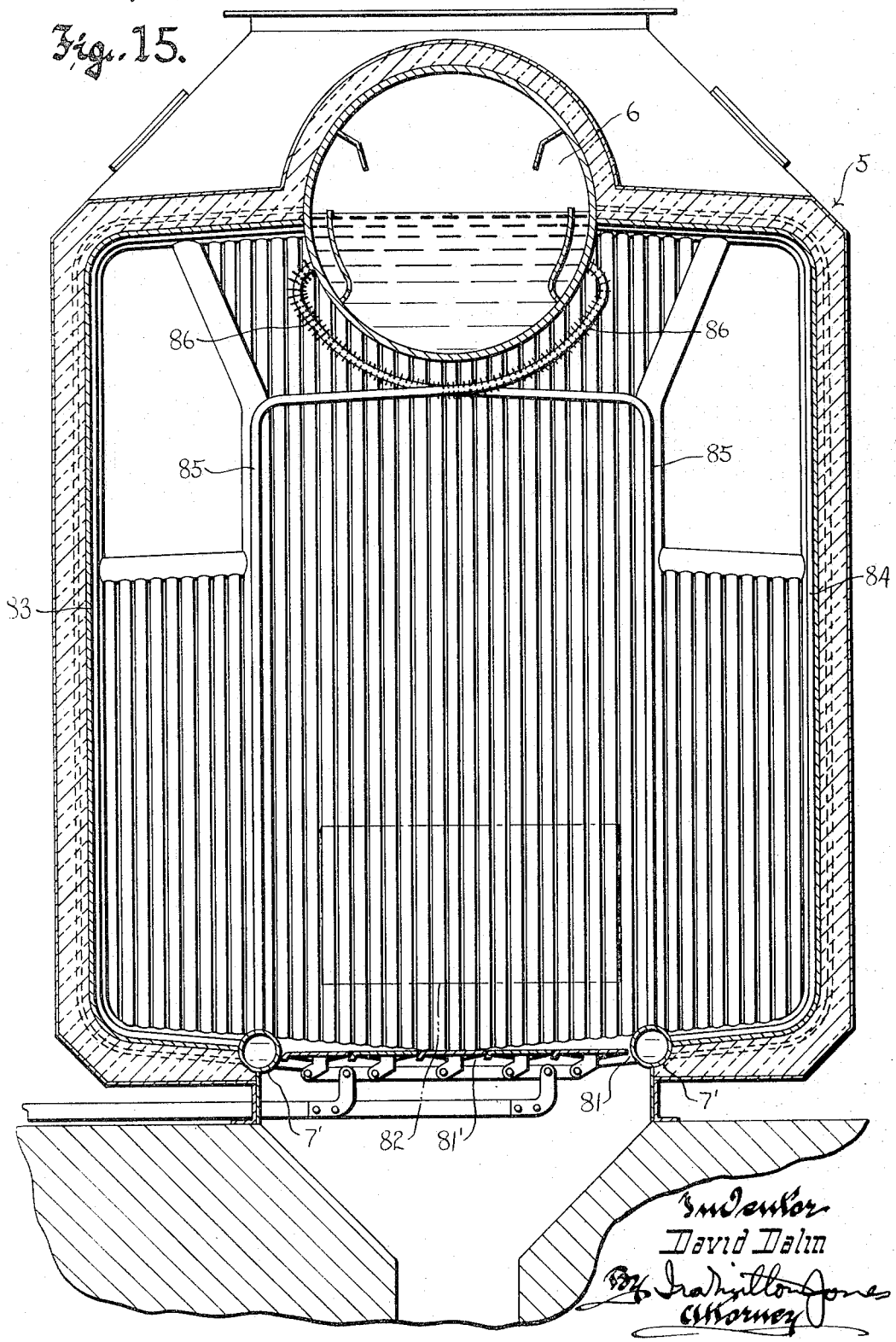

United States Patent Office 3,299,859
Patented Jan. 24, 1967

3,299,859
STEAM BOILER AND HOT WATER GENERATOR
David Dalin, Rue des Cordiers 2,
Geneva, Switzerland
Filed July 23, 1964, Ser. No. 384,644
13 Claims. (Cl. 122—328)

This invention relates to steam boilers and hot water generators.

As those familiar with the design and construction of boilers well know, it has been only recently that boiler manufacturers have begun to deviate from the time honored, though uneconomical, custom of erecting their boilers at the site of use. Thus, some boiler manufacturers are now making and selling so-called "packaged" boiler units. These are fully shop assembled boilers that can be shipped to the point of use, installed and put in operation with a minimum of cost. But, unfortunately, railroad and other road clearances impose a limit to the size and weight of such boiler units that may be shipped fully assembled. As a consequence, "packaged" boiler units presently available are limited in their steam and heating capacity and, while some manufacturers have sacrificed efficiency in order to increase capacity, the maximum capacity of the largest of these "packaged" boiler units presently available is approximately 100,000 pounds of steam per hour.

The need for and advantages of a boiler fully assembled and complete in every respect at the time it leaves the plant of the manufacturer, in capacities in excess of 100,000 pounds of steam per hour, have been recognized for some time; but until this invention the need has gone unanswered. With this invention, "packaged" boiler units which do not exceed the permissible size and weight limitations, can be built in capacities as high as 200,000 pounds of steam per hour and with an efficiency, pressure and superheat rating as high as that of any first class stationary boiler of the conventional type assembled or built on the site.

In boilers larger than 200,000 pounds of steam per hour—such as those used in large power plants—the steam is usually produced by radiant heat, and the convection heat is absorbed or abstracted by superheaters, economizers and air preheaters. Boilers made in accordance with the present invention can be equipped with superheaters, economizers and/or air preheaters arranged to abstract heat by convention, as has been customary in the past, while producing steam by convection as well as radiation. In fact, as a result of this invention, it is possible to build "packaged" boilers in which as much as one-half of the steam is produced by convection surfaces.

To recapitulate, it is the purpose and object of this invention to provide an improved boiler of the "packaged" type that can be built in capacities of 200,000 pounds of steam per hour and more, and water heaters in capacities up to and above 200 million B.t.u. per hour, all well within the physical size and weight limitations imposed by transportation facilities and road and railroad clearances, in which much of the steam is produced by convection surfaces, and wherein superheaters, economizers and/or air preheaters may be incorporated if desired.

Another object of this invention is to provide a boiler construction which permits a greater degree of standardization of parts, to thus take full advantage of modern production methods of manufacture. To illustrate, with this invention, a range of boiler sizes extending from a minimum of three million B.t.u. per hour to 200 million B.t.u. per hour can be obtained with only five cross-sectional sizes. In each of these five cross-sectional sizes, a wide range of capacities is achieved essentially by merely changing the length of the boiler by either adding or deducting standard elements.

Still another object of this invention is to provide a steam and/or hot water boiler in which the combustion chamber is so dimensioned and arranged as to provide maximum conduction efficiency, and the radiant heating surface is so arranged and dimensioned that it absorbs a maximum of heat by direct radiation, as well as by convection due to turbulent flow of the gases in the combustion chamber, to the end that approximately fifty percent of all the heat that can be economically utilized for direct steam production is exchanged in the combustion chamber.

In this connection, it is also an object of this invention to provide an improved steam and hot water boiler having convection heating surfaces separated from the combustion chamber by a tight wall of water tubes with openings for the passage of the hot gases, and wherein the convection heating surfaces are so dimensioned and arranged that the remaining fifty percent of heat usable for the production of steam or the generation of hot water is abstracted and exchanged by these convection surfaces.

A further object of this invention is to provide a boiler of the character described, wherein the outside walls, ceiling and floor of the boiler enclosure are gas-tight, making it possible to use forced draft combustion, and eliminating in most cases, exhaust fans, while—at the same time—also eliminating hidden pockets in which soot and corrosive matter can accumulate.

A significant feature of this invention is that all of the various parts of the convection surfaces can be reached from the access openings with which the boiler is equipped, thus making it possible to direct streams of water against these surfaces to clean them. This accessibility also facilitates the making of repairs, when necessary, since it enables any tube in the boiler to be cut and removed without necessitating costly dismantling, as was heretofore necessary.

In the ideal boiler, there is a proper balance between the volume of the combustion chamber, the radiant heating surface and the heat-exchanging ability of the convection section. Heretofore, this balance has been difficult to achieve. In smaller boilers, the radiant surface was much too large in proportion to the required combustion chamber volume, while in larger boilers the reverse was true. For this reason, it was necessary in the past when high capacities were required, to not only greatly increase the size of the boiler, but in addition, use a rather uneconomical and difficult design. With the present invention, the optimum balance between the volume of the combustion chamber, the radiant heating surface and the heat-exchanging ability of the convection section is achieved at low cost, small physical size and with a design that lends itself readily to standardization and production by inexpensive methods of manufacture.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention, constructed according to the best modes so far devised for the practical application of the principles thereof, and in which:

FIGURE 10 is a horizontal sectional view through the hot water generator, taken on the plane of the line 10—10 in FIGURE 8;

FIGURE 11 is a cross sectional view through a steam boiler embodying this invention in another form;

FIGURE 12 is a fragmentary sectional view through FIGURE 11 on the plane of the line 12—12;

FIGURE 14 is a detail cross sectional view through FIGURE 11 on the plane of the line 14—14; and FIGURE 15 is a cross sectional view similar to FIGURE 2, but illustrating the boiler of this invention adapted for coal-fired operation.

Figure 1:
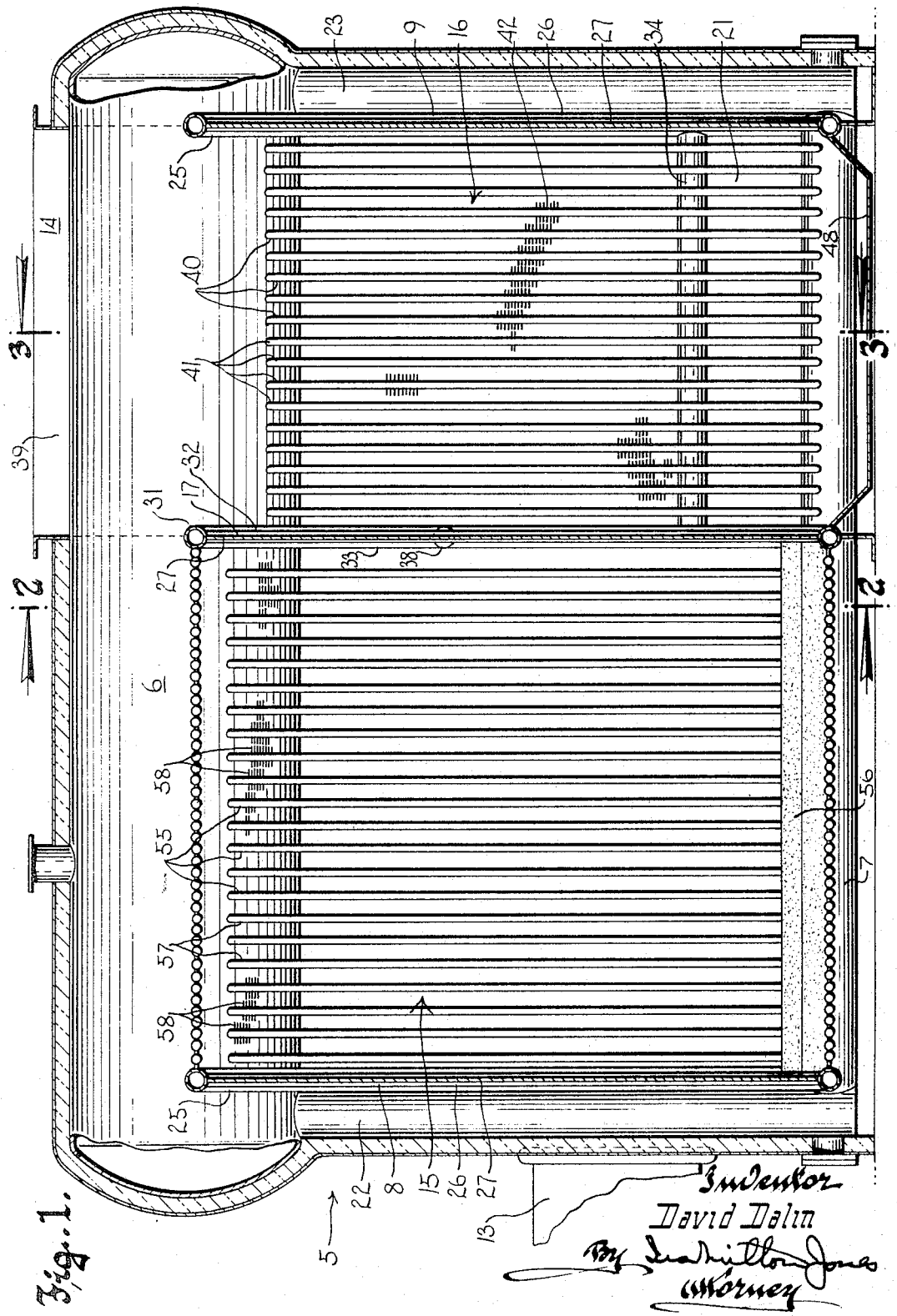
FIGURE 1 is a longitudinal sectional view through a steam boiler embodying this invention, and taken generally on the plane of the line 1—1 in FIGURE 2.
Figure 2:
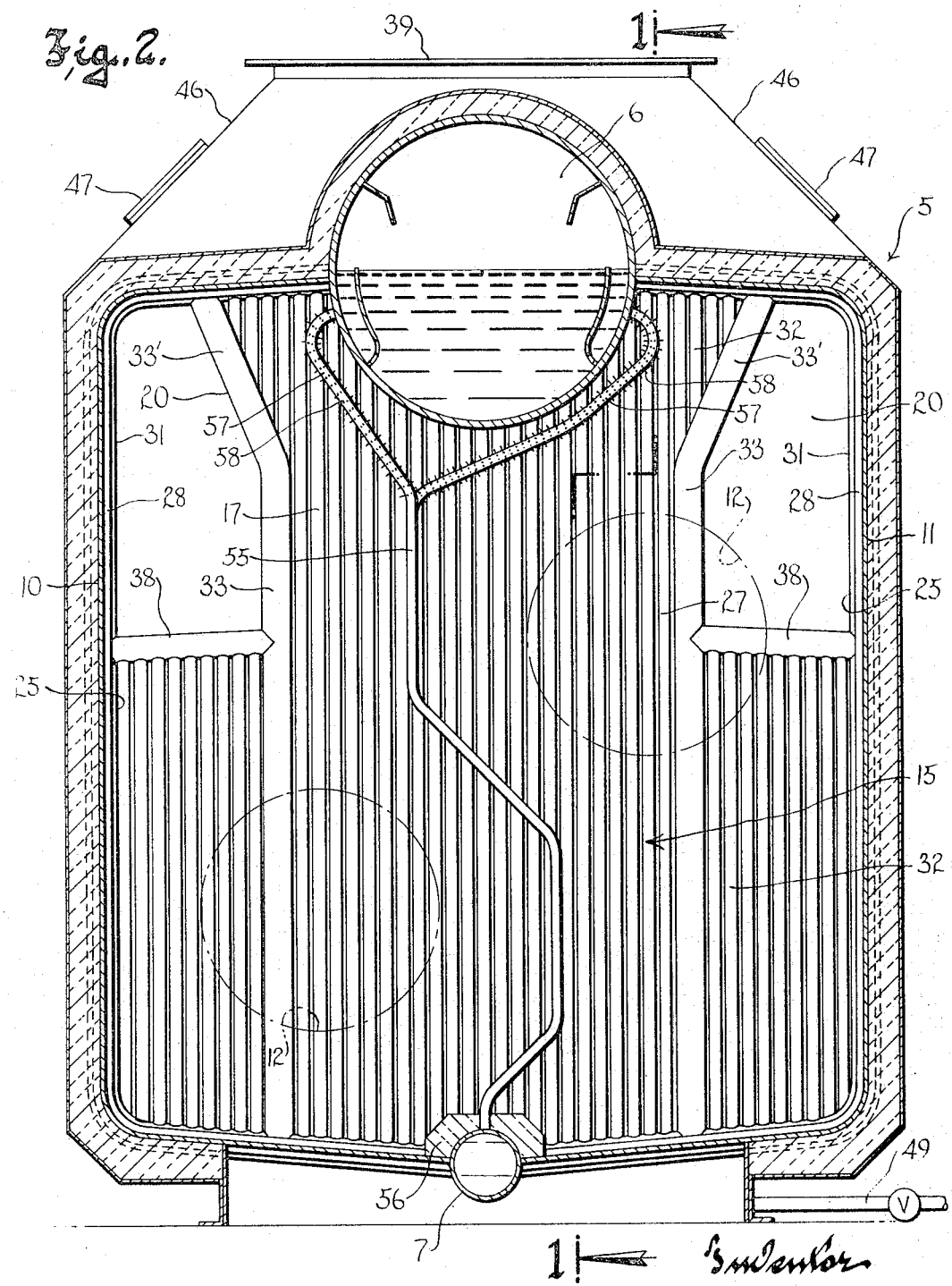
FIGURE 2 is a cross sectional view through FIGURE 1 on the plane of the line 2—2.
Figure 3:
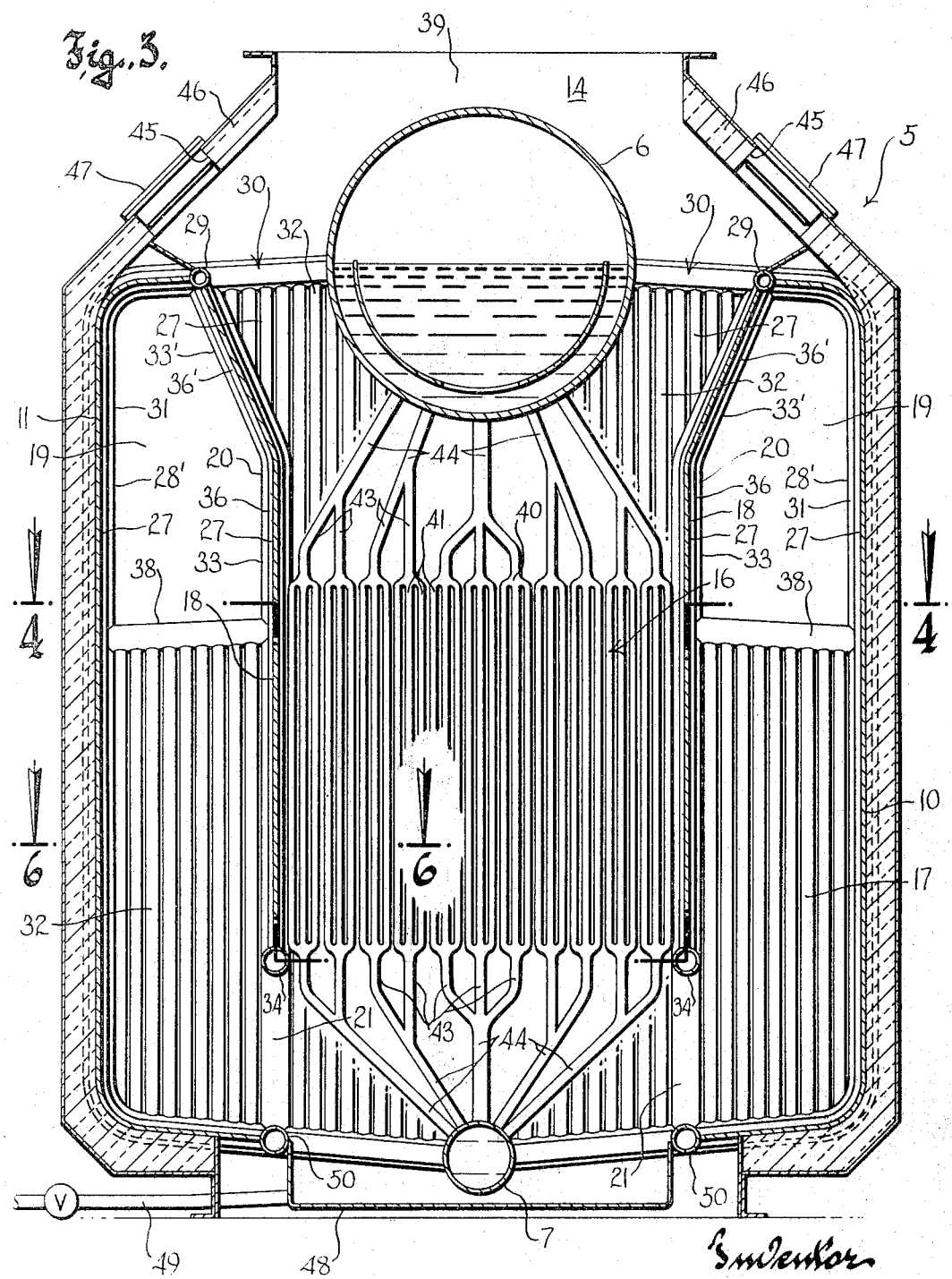
FIGURE 3 is a cross sectional view through FIGURE 1 on the plane of the line 3—3.
Figure 4:
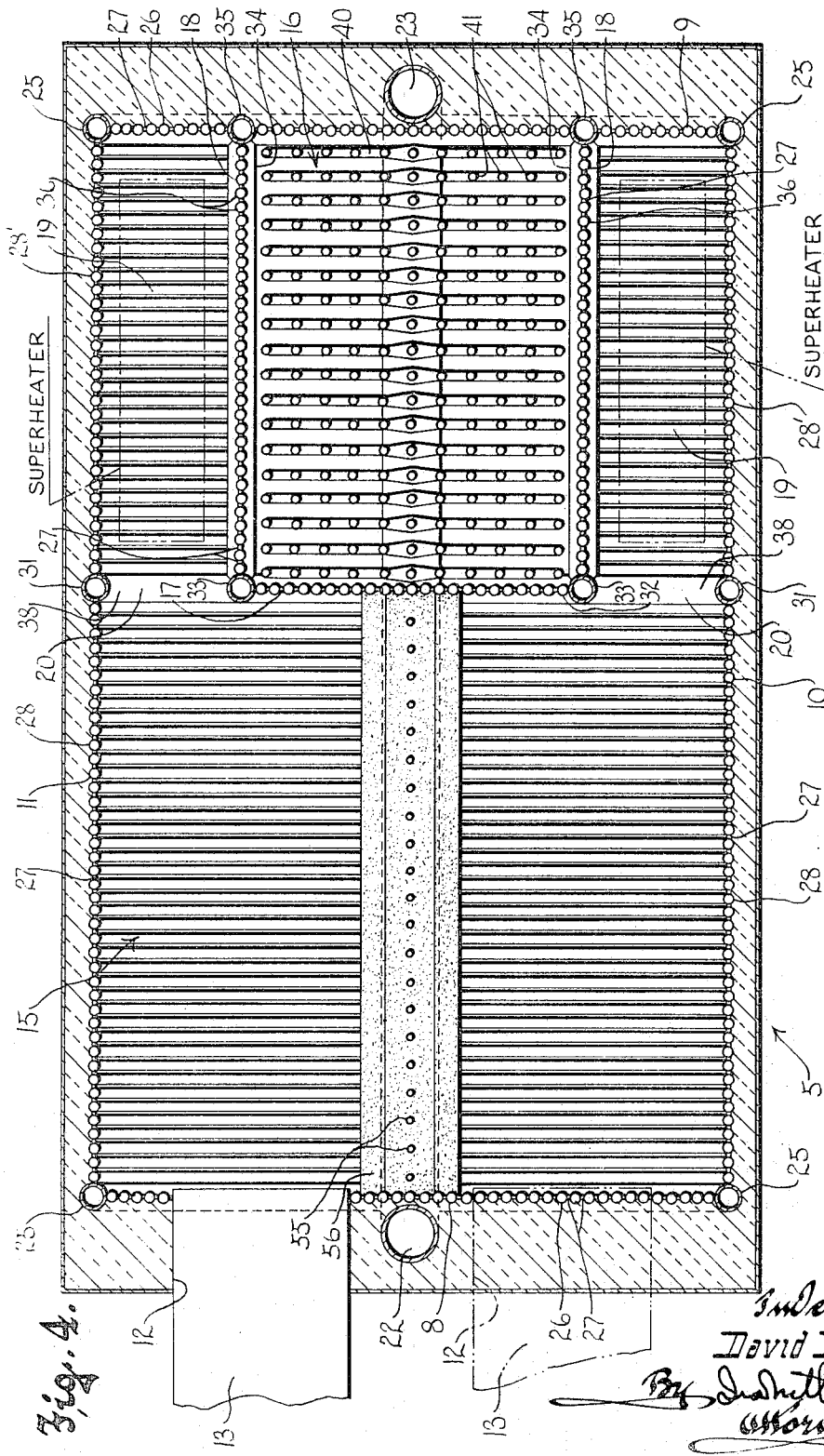
FIGURE 4 is a cross sectional view through FIGURE 3 on the plane of the line 4—4.
Figure 5:
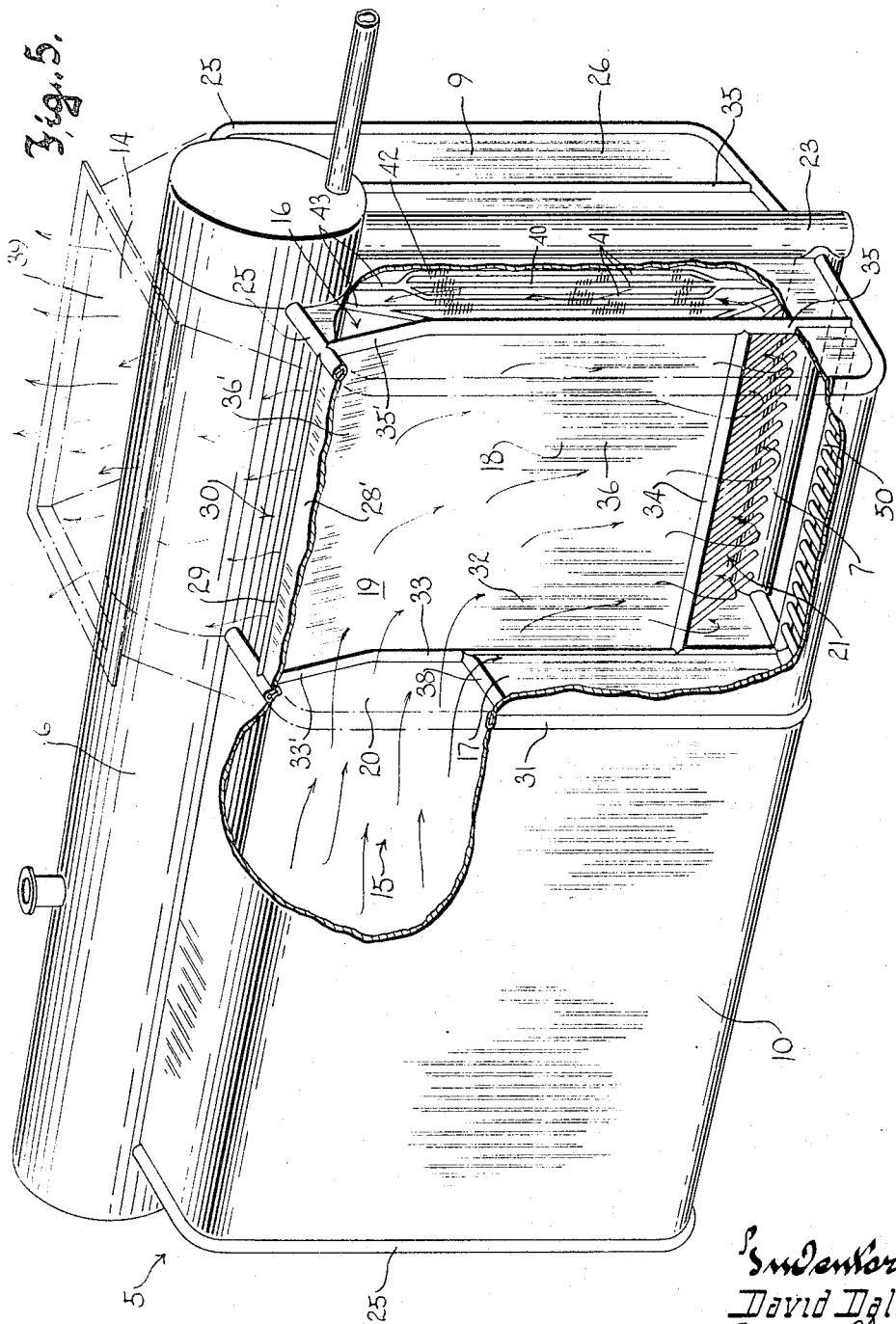
FIGURE 5 is a perspective view with parts broken away and in section, of the boiler shown in FIGURES 1, 2, 3 and 4.
Figure 6:
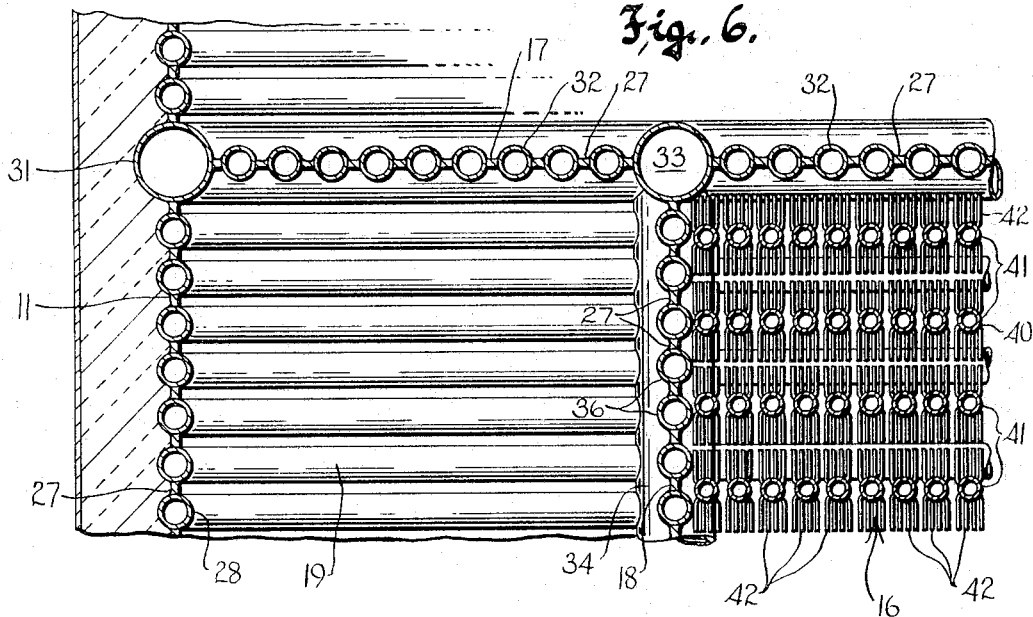
FIGURE 6 is an enlarged, detail cross sectional view on the plane of the line 6—6 in FIGURE 3.
Figure 7:
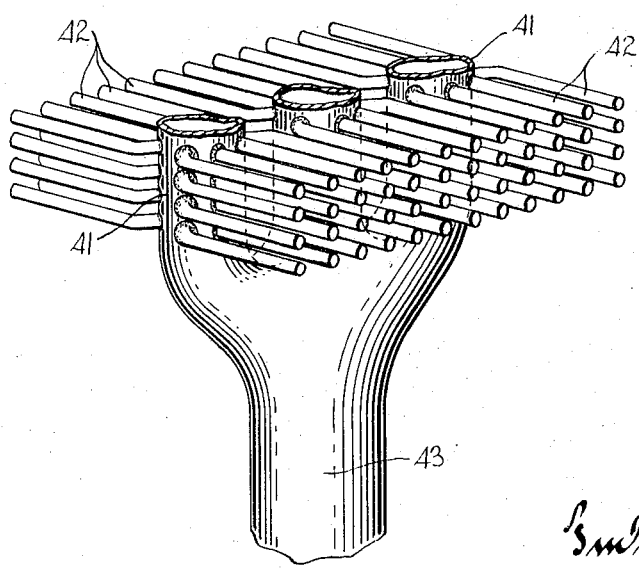
FIGURE 7 is a detail perspective view illustrating a portion of one of the convection surfaces.

Referring now particularly to the accompanying drawings in which like numerals indicate like parts throughout the several views, in each embodiment of this invention there is a generally four-walled enclosure 5 which is formed entirely of water tubes. Some of these tubes directly connect an upper receiving header 6 with a lower distributing header 7. In all instances, the upper and lower headers are elongated and parallel to one another and in the preferred embodiment of the invention illustrated in FIGURES 1–10, inclusive, the axes of the headers lie in the vertical median plane of the unit about which the entire structure is transversely symmetrical.

The symmetrical disposition of the structure is not followed in the embodiment of the invention shown in FIGURES 11–14, and in the modification illustrated in FIGURE 15 there are two transversely spaced distributing headers 7'.

In the preferred embodiment of the invention (FIGURES 1–10, inclusive) the wall-forming water tubes provide a front wall 8, a rear wall 9 and side walls 10 and 11. The front wall 8 has one or more inlet openings 12 (there being two in the present case) to accommodate the nozzles 13 of oil or gas burners, or any other suitable heat source, by which a combustible fuel mixture is projected into the interior of the enclosure, to burn therein. The spent combustion gases leave the enclosure through an outlet 14 which leads from the upper rear portion of the enclosure and connects with a stack (not shown) in the customary manner.

The boiler enclosure is divided into a combustion chamber 15 to which the inlet or inlets 12 lead, and a convection chamber 16, the top of which opens to the outlet 14. To so divide the enclosure, a transversely extending wall 17 of water tubes is provided, all of which are connected, either directly or indirectly, with the upper and lower headers; and the portion of the enclosure behind the transverse wall 17 is divided by means of two transversely spaced vertical walls 18 of water tubes into a middle section which provides the convection chamber 16 and two outer or side sections which define rearward extensions 19 of the combustion chamber 15. These rearward extensions of the combustion chamber, which may be considered auxiliary combustion chambers, are communicated with the main combustion chamber 15 through openings 20 in the upper portion of the transverse wall 17, transversely outwardly of the walls 18.

Hot combustion gases from the main combustion chamber 15 pass through the openings 20 into the auxiliary combustion chambers 19, and from there they pass to the convection chamber 16 through openings 21 in the lower portions of the transversely opposite walls 18.

In the case of the steam boiler version of the invention (FIGURES 1–7) the opposite ends of the upper and lower headers are directly connected by downcomers 22 and 23 which are respectively outside the front and rear walls 8 and 9. Natural circulation thus occurs when the boiler is in operation, the flow being downward from the upper header or steam drum, through the downcomers 22 and 23, into the lower distributing header, and upward through all of the water tubes which connect the upper and lower headers.

The front and rear walls 8 and 9, respectively, are each bounded by a pair of similar U-shaped tubes 25 of relatively large diameter, having their upper ends connected to the upper header or steam drum, below the water level therein, and their lower ends connected with the distributing header 7. These U-shaped tubes 25 constitute a frame for the front and rear end walls of the boiler enclosure, and their vertical stretches serve as the four corners of the enclosure.

The actual front and rear walls 8 and 9 are formed by vertical tubes 26 connected to one another by bridging strips 27 welded to the tubes, so that the tubes and the bridging strips coact to form solid gas-tight walls. The opposite ends of the tubes 26 are connected to the arms of the tubes 25 or to the upper and lower headers 6 and 7.

The side walls 10 and 11 of the boiler enclosure are defined by two opposed groups of water tubes 28, all of which are of the same U-shaped form as the corner units 25. Bridging strips 27 welded between adjacent tubes 28 coact therewith, as in the case of the front and rear walls, to form continuous gas tight walls. Forwardly of the transverse partition wall 17 the opposite ends of the U-shaped tubes 28 connect with the upper header or steam drum 6 and with the lower distributing header 7; but rearwardly of the transverse partition wall 17 the U-shaped side wall-forming tubes, designated 28', are shorter and instead of being connected to the upper header or steam drum 6, they have their upper ends connected to longitudinally extending manifold tubes 29. This results in openings 30 in the upper portion of the enclosure, one at each side of the steam drum or upper header.

The rear ends of the longitudinally extending manifold tubes 29 are joined to the upper legs of the adjacent U-shaped corner tubes 25 and their front ends are joined to the upper legs of similar U-shaped tubes 31, which—like the tubes 25—connect the upper and lower headers. The tubes 30 are in line with and bound the transverse partition wall 17.

The transverse partition wall 17 consists of vertical water tubes 32 with bridging strips 27 welded therebetween. Where the transverse partition wall 17 meets the longitudinally extending partition walls 18, there are larger diameter vertically disposed tubes 33, the lower ends of which are joined to the bottom legs of the U-shaped tubes 31 and the upper ends of which are connected to the upper legs of the U-shaped tubes 31.

Attention is directed to the fact that the upper end portions 33' of the tubes 33 are inclined outwardly away from the upper header or steam drum for a purpose to be described.

Horizontally disposed tubes 34 connect with and extend rearwardly from the lower portions of the vertical tubes 33 to have their rear ends connected to the lower portions of vertical tubes 35 which lie in the rear wall 9 and, like the tubes 26 thereof, have their opposite ends connected to the upper and lower legs of the adjacent U-shaped tubes 25. The tubes 35 are identical in shape with the tubes 33 and hence have their upper end portions 35′ sloping outwardly. The tubes 29, 33, 34 and 35 thus provide frames for the partition walls 18, which consist of laterally adjacent water tubes 36 with bridging strips 27 therebetween, the upper ends of the tubes 36 being connected to the manifold tubes 29 and their lower ends to the tubes 34. The upper portions 36′ of the tubes 36 are inclined outwardly like the upper portions 33′ and 35′ so that the upper portions of the longitudinal partition walls 18 slope outwardly away from the upper header.

The tubes 34, as will be seen, define the upper edges of the openings 21 through which the auxiliary combustion chambers 19 communicate with the convention chamber 16.

The water tubes 32 which form that part of the transverse partition wall 17 which lies between the longitudinal partition walls 18, extend all the way from top to bottom of the enclosure. Thus, the upper ends of these tubes connect with the underside of the upper header or steam drum or with the upper legs of the U-shaped tubes 31, while the lower ends of all of these tubes connect with the bottom legs of the U-shaped tubes 31 or the distributing header 7. The water tubes 32 which form the upper triangular portions of the transverse partition wall directly above the outwardly sloping surfaces of the partition walls 18, have their lower ends connected to the outwardly sloping upper end portions 33′ of the tubes 33, while their upper ends are, of course, connected to the upper legs of the tubes 31.

Outwardly of the longitudinal partition walls 18, the vertical water tubes 32 are shorter and reach only from the bottom legs of the U-shaped tubes 31 to cross tubes 38 which connect the vertical stretches of the tubes 31 with the tubes 33, and define the lower edges of the openings 20 through which the main combustion chamber is communicated with the auxiliary combustion chambers.

The outwardly sloping disposition of the partition walls 18 mentioned before, increases the width of the openings 30 through which the convection chamber 16 communicates with a smoke box 39 which defines the outlet 14, and thereby facilitates access to the convection chamber. This is of importance from the standpoint of cleaning the convection surfaces 40 which are uniformly distributed in the convection chamber and extend vertically therein between the upper and lower headers.

The convection surfaces 40 comprise a nest of vertically extending equispaced tubes 41, all of which are equipped with extended surfaces 42 of the type forming the subject matter of Patent No. 2,584,189, issued February 5, 1952, to David Dalin. Preferably the tubes 41 are arranged in groups of three with each such group having a common trunk 43 at its upper and lower ends. The trunks 43 are in turn joined to the main trunks 44, the upper ones of which are connected to the upper header or steam drum 6, and the lower ones of which are connected to the distributing header 7. Hence, all of the convection surface tubes connect the upper and lower headers.

It should be noted that the junctions of the lower ends of the tubes 41 with their common trunks 43 lie in the plane of the tubes 34 and hence are directly above the openings 21 through which the combustion gases enter the convection chamber. The point at which the upper ends of the tubes 41 join their trunks 43, and hence the length of the extended surface equipped tubes 41, largely determines the total heat exchange capacity of the convection surfaces, and ordinarily the tubes 41 will reach at least to the level of the cross tubes 38. With the upper ends of the tubes 41 at approximately that level, access thereto from above for cleaning and inspection is assured since the common trunk and main trunk tubes which connect groups of the tubes 41 with the upper header are quite widely spaced.

The combustion gases entering the convection chamber at the bottom thereof, through the openings 21, flow upwardly lengthwise of the tubes 41 but crosswise of their extended surface elements 42, and pass out of the convection chamber through the openings 30 into the smoke box 39.

The described uniform distribution and arrangement of the convection surfaces and their extended surface assures that all portions of the convection surfaces receive equal heat. It also assures against channeling of hot gases through the convection chamber without contributing to the desired heat transfer.

Many of the fuels used to fire boilers contain large amounts of sulfur which, during the combustion process, produces chemical combinations containing more or less concentrated sulphuric acid. If this sulphuric acid is not regularly removed by cleaning, it will corrode the metal parts, particularly the lowest situated tubes and finally result in boiler failure. It has been found that the best cleaning medium is warm water, liberally splashed over all parts of the convection surfaces at suitable intervals. Moreover, cleaning the convection surfaces with water has the advantage of not contaminating the atmosphere during the cleaning operation, as in the case when steam or air soot blowers are used.

The boiler of this invention is especially well adapted for cleaning of its convection surfaces by water, since the wide access spaces 30 and the provision of ports 45 in the upper sloping walls 46 of the smoke box—which, of course, are normally closed by removable covers 47, make it very convenient to project streams of water from a hose nozzle down onto all portions of the convection surfaces.

The sulphuric-acid laden water accumulates in a large pan 48 located below the convection chamber, and provided with a drain line 49 which leads to the exterior of the boiler. To provide the needed communication between the bottom of the convection chamber and the collecting pan, the U-shaped side wall forming tubes 28′ at this rear portion of the boiler enclosure, have their lower ends connected to longitudinally extending manifold tubes 50, which are parallel to and spaced outwardly from the distributing header 7, having their opposite ends connected to the lower legs of the U-shaped tubes 25 and 31. The side walls of the collecting pan 48 connect to these tubes 50, as clearly seen in FIGURE 3.

Since the collecting pan 48 has considerable volume and is usually made of acid-resisting stainless steel, it provides a collecting reservoir in which the acid-laden cleaning water is diluted to the point where its pH value is high enough to permit discharging the same directly into the sewer.

As those skilled in the art well know, in the case of steam boilers it is often desirable, and perhaps even customary, to provide the boiler with a superheater so that the steam produced will be superheated. Ordinarily, the superheater is located in the convection zone of the furnace. In the boiler of this invention, the entire convection zone or chamber 16 is occupied by the convection surface tubes 41 and their extended surface elements 42. Nevertheless, the boiler of this invention accommodates a superheater without in anywise altering its design or overall dimensions, since each of the auxiliary combustion chambers 19 which flank the convection chamber 16, provides a convenient location for a superheater, as diagrammatically indicated in FIGURE 4.

If an economizer or air preheater is required, these units could be located in the flue gas duct (not shown) which leads from the outlet 14 of the smoke box. Thus placed, the economizer or air preheater would not interfere with removal of tubes through the access openings 30 and 45, if such removal became necessary.

As noted hereinbefore, this invention makes it possible to increase the capacity of the boiler without in anywise altering the cross sectional size and shape of the unit and still maintaining the desired balance between the volume of the combustion chamber, the area of the radiant heating surface and the heat exchanging ability of the convection section. This flexibility results largely from the fact that by simply increasing the length of the unit, both fore and aft from the transverse partition wall 17, all three of these heat transfer parameters will be increased in effectiveness.

If it is necessary to increase the area of the radiant heating surface beyond that which is available in the four walls of the main combustion chamber and in the walls 18 of the auxiliary combustion chambers 19, after the length of the boiler has been increased to its practical limits, a longitudinally disposed wall of tubes 55 may be provided in the main combustion chamber. As seen best in FIGURE 2, this wall of tubes connects the upper and lower headers and divides the main combustion chamber into two laterally adjacent sections of substantially the same cross sectional area. Although this wall of water tubes divides the combustion chamber into two sections, as stated, it does not isolate them from one another, since the tubes 55 are spaced apart and not connected. This allows the gases to flow from one side of the combustion chamber to the other, and thus equalizes the gas pressure at opposite sides of the "partition" wall.

The provision of such a longitudinally extending "partition" wall 55 greatly increases the radiant heating surface and provides for ample water and steam circulation from the distributing header 7 to the upper collecting header—thereby assuring against overheating the top of the distributing header. If further protection against this possibility is desired, a refractory cover 56 may be extended across the full length of that portion of the distributing header which is located in the main combustion zone.

Provision of the "partition" wall 55 also has the advantage of enabling the underside of the steam drum or upper header 6 to be protected against the high temperature radiant heat. To this end, the tubes comprising the wall 55 have their upper portions 57 alternately directed towards opposite sides of the boiler to collectively embrace the lower portion of the steam drum, and have extended surface elements 58 projecting therefrom so as to better shield the steam drum against direct radiation rays.

The irregular shape of the "partition" wall 55 is dictated by the locations of the burner nozzles, it being desirable to have the wall substantially equispaced from these nozzles.

*The hot water generator (FIGURES 8, 9 and 10)*

Figure 8:
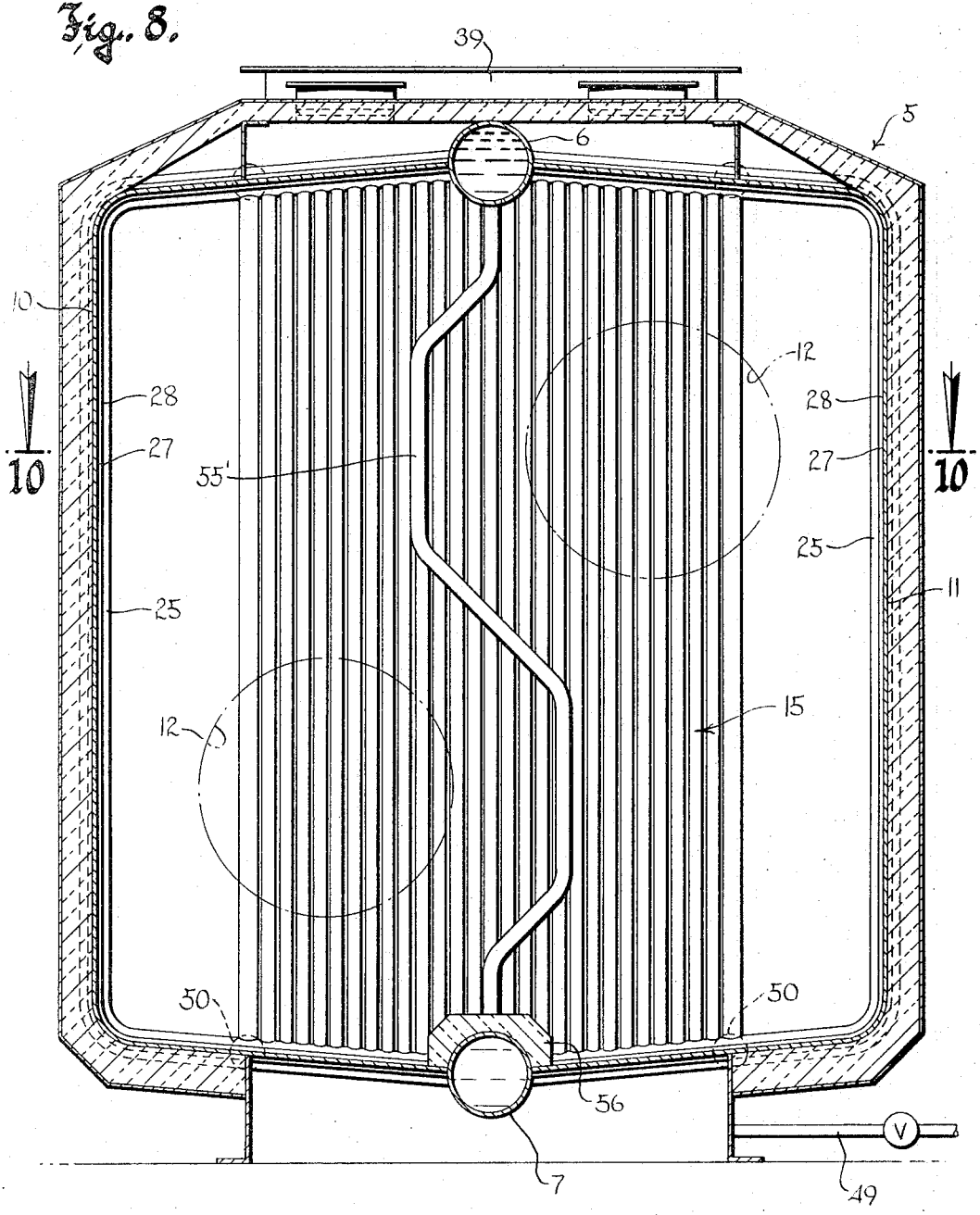
FIGURE 8 is a cross sectional view similar to FIGURE 2, but illustrating this invention embodied in the form of a hot water generator, as distinguished from a steam boiler, said view being taken on the plane of the line 8—8 in FIGURE 10.
Figure 9:
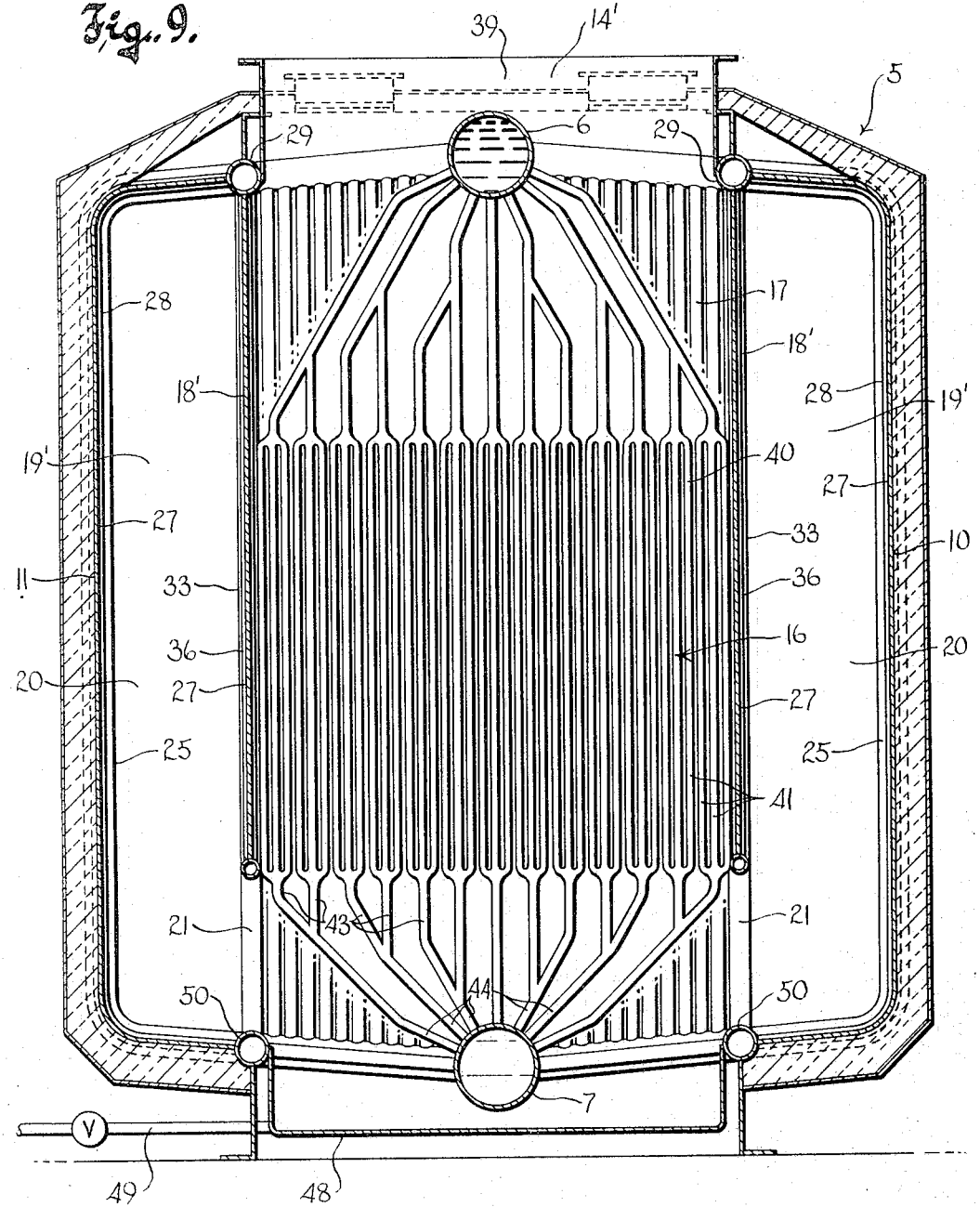
FIGURE 9 is a cross sectional view through the hot water generator, taken through FIGURE 10 on the plane of the line 9—9.
Figure 13:
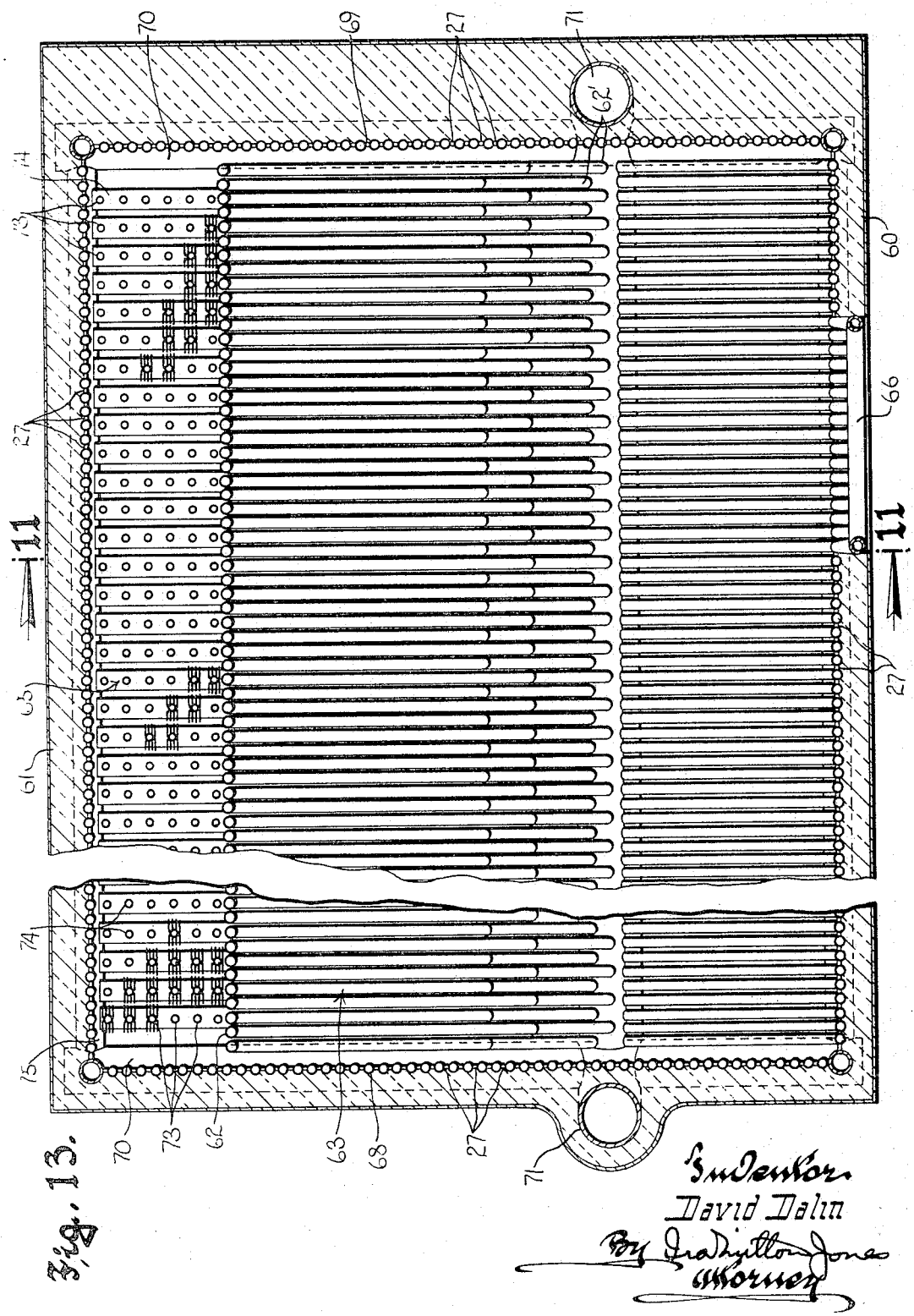
FIGURE 13 is a horizontal sectional view taken through FIGURE 11 on the plane of the line 13—13.

In most respects, the hot water generator of FIGURES 8, 9 and 10 is quite similar to the steam boiler of FIGURES 1–7, inclusive. However, in this case there are no downcomers connecting the upper and lower headers. Instead, circulation is effected by connecting the generator in a closed circulation system (not shown) which includes heat exchangers to be supplied with hot water from the upper collecting header 6 and a pump which forces the water into the lower distributing header 7 under pressure. Since the upper collecting header is smaller in diameter in this case, it does not seriously obstruct the outlet 14' which encompasses the entire horizontal area of the convection section. This permits the walls 18' to be straight from top to bottom and still allows almost unrestricted access to the convection surfaces.

Another structural simplification of the hot water generator version of the invention resides in the fact that the auxiliary combustion chambers 19' are in open communication with the main combustion chamber 15 for their entire height. This eliminates the cross tubes 38.

To gain added radiation surface, if needed, the water generator also may have a "partition" wall 55' of tubes connecting the upper and lower headers, arranged and positioned as in the case of the steam boiler.

*Boiler of FIGURES 11, 12, 13 and 14*

The boiler illustrated in FIGURES 11–14, utilizes and takes advantage of all of the desirable features of the boiler heretofore described, except those which flow from the symmetry of the aforesaid construction. In this case, the upper header or steam drum 6 and the lower distributing header 7 have their axes parallel with the front and rear walls 60 and 61 of the boiler, rather than perpendicular thereto. Also, a single partition wall 62 divides the interior of the boiler enclosure into a main combustion chamber 63, an auxiliary combustion chamber 64, and a convection zone or chamber 65, the latter being in the rear portion of the enclosure and defined in part by the rear wall 61. As before, all of the exterior walls are gas tight and formed of water tubes with bridging webs 27 welded to and joining the tubes. The front wall, of course, is provided with one or more ports 66 to accommodate burner nozzles, not shown.

The water tubes and their bridging webs which line the front wall 60 of the housing, directly connect the upper and lower headers 6 and 7. The water tubes which line the side walls 69 and 68 of the enclosure have their lower ends connected to manifolds 70 which, in turn, are medially connected to the distributing header 7. Downcomers 71 in the side walls connect the distributing header with the upper header of steam drum 6. The upper ends of the water tubes which line the side walls connect either with the underside of the upper header or steam drum or manifold tubes which in turn are connected with the upper header or steam drum, but do not appear in the drawings, since they lie behind collector tubes 72 in FIGURE 11.

The collector tubes 72 have one end closed and the other end opening to the steam drum; and—as seen in FIGURE 11—have the upper ends of convection section tubes 73 connected thereto. The lower ends of the convection tubes 73 are connected to distributor tubes 74, which like the tubes 72 are closed at one end, and have their other ends connected to the lower header 7.

The water tubes which form the rear wall 61 have their lower ends connected to a distributing tube 75 which connects the adjacent ends of the manifolds 70, and have their upper ends connected, either directly or indirectly, with the closed end portions of the collector tubes 72. Since the spacing of the water tubes which form the rear wall 61 is about half the spacing of the convection tubes 73 and the collector tubes 72, only every other one of the tubes that form the rear wall can be directly connected with one of the collector tubes 72. The remaining rear wall tubes are indirectly connected with the tubes 72 by bridging tubes 76, as shown in FIGURE 14.

The convection tubes 73 are, of course, equipped with extended surface elements as in the previously described embodiment of the invention, and are also uniformly distributed throughout the volume of the convection zone or chamber 65 so that all portions of the convection surfaces are uniformly heated.

Cleaning of the convection surfaces by water is a simple matter since access thereto is quickly and easily effected by merely removing the covers 77 of access openings in the wall portion 78 of the flue gas passage 79 through which the combustion gases pass to the stack (not shown). The water used to clean the convection surfaces collects in the pan 48' and is discharged as before.

The flue gas passage 79 may have an economizer 80 mounted therein, if desired, and in this connection it should be noted that this embodiment of the invention makes provision for an economizer without entailing any increase in the overall dimensions of the boiler.

The water tubes which form the partition wall 62 and separate the convection chamber from the main combustion chamber are quite closely spaced, though not connected, throughout all but their lower end portions 62'. Here these tubes are arranged in a staggered relationship, as seen in FIGURE 12, to afford relatively open communication between the main combustion chamber 63 and the auxiliary combustion chamber 64 which leads to the convection chamber.

Attention is directed to the fact that all portions of the partition wall 62, like the partition walls 18 in the preferred embodiment of the invention, are parallel to the axes of the upper and lower headers 6 and 7. Hence, by increasing the distance between the side walls 68 and 69, i.e. making the unit wider, the volume of the combustion and convection chambers, the area of the radiation surfaces, and the heat exchange ability of the convection surfaces, are all increased, which of course gives the boiler added capacity—and does so without deviating from the cross sectional size and shape of the unit transversely of the header axes, and without disturbing the desired balance between the aforesaid three heat exchange parameters.

FIGURE 15

FIGURE 15 illustrates one way in which this invention may be adapted for coal firing. In many respect the structure here shown is the same as that of FIGURES 1–7, and to the extent that the two structures are alike, no need exists for specifically describing the boiler shown in FIGURE 15.

The only significant difference between the two resides in the fact that in the boiler of FIGURE 15, the floor of the main combustion chamber is provided with an opening 81 to accommodate a grate 81 upon which the coal or other solid fuel rests. Any suitable means may be provided to introduce the fuel through a fire door 82, indicated in broken lines, and located in the front wall of the unit.

The sides of the opening 81 are defined by lower distributing headers 7' suitably connected with the downcomers (not shown) of the boiler. The bottom legs of the U-shaped tubes which form the sides 83 and 84 of the main combustion chamber connect with the headers 7', as do also the tubes which form a pair of "partition" walls 85. These latter tubes connect the lower distributing headers 7' with the steam drum or upper collecting header 6, and provide added radiation surface; and by having their upper end portions 86 shaped to embrace the bottom of the steam drum they protect the latter from the intense radiant heat rays, especially since these portions 86 are equipped with extended surface elements.

In this specification and the appended claims unless otherwise specified, where the term "boiler" is used, it is to be understood that it encompasses not only the steam boilers shown in FIGURES 1–7 and 11–15, but also the hot water generator shown in FIGURES 8–10.

It should now be apparent to those skilled in this art that this invention provides a greatly improved steam boiler and/or hot water generator, but—for the sake of emphasis—attention is particularly directed to the following advantageous features of the invention:

(1) At the outset, the invention makes possible the production of packaged boilers with capacities far in excess of those heretofore attainable in such boilers;

(2) It enables the attainment of a wide range of capacities without requiring alteration in the cross sectional size and shape of the unit so that, by mere multiplication of standard parts, it is possible to significantly increase the capacity of the unit;

(3) The invention makes possible standardization of individual parts to a degree unprecedented in boiler manufacture;

(4) It enables the maintenance of an optimum balance between the volume of the combustion chamber, the area of the radiant surfaces, and the heat-exchanging ability of the convection surfaces over a wide range of capacities;

(5) It affords good and convenient access to all of the tubes in the boiler so that cutting out a damaged tube, if necessary, can be accomplished without requiring a major dismantling operation, and cleaning of the convection surfaces by forcibly directing streams of water against them is a simple matter;

(6) The gas-tight construction and formation of its outside walls makes possible the use of forced draft combustion and eliminates exhaust fans in most cases;

(7) The gas-tight construction also eliminates hidden pockets in which soot and corrosive matter can accumulate; and, finally, (8) This invention significantly reduces the cost of the boiler.

What is claimed as my invention is:

1. In a water tube boiler having upper and lower elongated parallel header means, laterally adjacent water tubes connecting the upper and lower header means and arranged to form the boiler enclosure, said enclosure having inlet means through which fuel for combustion may enter the enclosure, and outlet means for spent gases, and other water tubes inside said enclosure connecting the upper and lower header means and arranged to form a partition which divides the interior of the enclosure into a combustion chamber to which the inlet means leads and a convection chamber from the upper portion of which the outlet means leads, said partition being formed with passage means in the bottom portion thereof through which the two chambers are communicated so that combustion gases entering the convection chamber from the combustion chamber flow upwardly in the convection chamber, the improvement which comprises:

a bank of water tubes with extended surface thereon also connected with both header means and uniformly distributed in the convection chamber above said passage means in the partition to provide convection surface for the boiler, all of the tubes in said bank being vertical so as to be parallel to the flow of gases through the convection chamber, and the extended surface on said tubes consisting of a multiplicity of individual elements of metal having relatively good heat conductivity, secured to and projecting substantially perpendicularly from the tubes so as to be transverse to the gas flow in the convection chamber.

2. The water tube boiler of claim 1, further characterized by a pan in the bottom of the boiler enclosure beneath the convection chamber to receive and accumulate cleansing liquid splashed against the convection surface tubes and their extended surface, and means providing access to the upper portion of the convection chamber through which streams of cleansing liquid may be projected against said convection surfaces.

3. In a water tube boiler:

A. upper and lower elongated headers, the axes of which are parallel;

B. front and rear exterior walls transverse to the header axes and near the opposite ends thereof and comprising laterally adjacent water tubes connecting the headers;

C. side, top and bottom exterior walls also comprising laterally adjacent water tubes connecting the headers, joined to and coacting with the front and rear exterior walls to form a boiler enclosure, said enclosure having inlet means at its front end portion to accommodate a heat source and outlet means for spent gases near its rear end portion;

D. a transverse partition wall inside said enclosure dividing the same into a main combustion chamber at the front end portion of the enclosure to which the inlet means leads, and a convection chamber at the rear end portion of the enclosure from which the outlet means leads, said transverse partition wall also comprising water tubes connected with the headers, and having transversely spaced openings through which hot combustion gases leave the main combustion chamber for passage to the convection chamber;

E. a pair of longitudinal partition walls also formed of water tubes connected with the headers, extending from said transverse partition wall inwardly of said transversely spaced openings therein and parallel to the header axes to the rear exterior wall to divide the rear portion of the enclosure into three transversely adjacent sections, the middle one of which forms the convection chamber and has the outlet means leading from its upper portion, and the two outer sections forming auxiliary combustion chambers, the transversely spaced openings in the transverse partition wall communicating the main and auxiliary combustion chambers, said pair of transversely spaced longitudinal partition walls being joined to the top of the enclosure, but being spaced from the bottom thereof to provide openings through which the auxiliary combustion chambers are communicated with the convection chamber so that hot gases may flow from the main combustion chamber into the auxiliary combustion chambers and out of the lower portions of said auxiliary combustion chambers into the convection chamber for passage therethrough to the outlet means, all of the aforesaid water tubes providing radiant heating surfaces for the boiler; and F. a bank of water tubes with extended surface thereon also connected with the headers and uniformly distributed in the convection chamber to provide convection surfaces for the boiler, the aforesaid disposition of said pair of longitudinal partition walls enabling the volume of the two chambers, and hence the capacity of the boiler to be increased, without change in the size and shape of the boiler transversely of the header axes, and without substantially altering the ratio of heat abstracted by the radiant and convection surfaces, by increasing the distance between the front and rear exterior walls and correspondingly increasing the length of said pair of longitudinal partition walls and the number of tubes comprising the side, top and bottom walls of the boiler enclosure.

4. In a water tube boiler, the combination of claim 3, wherein the upper header is symmetrically disposed above the convection chamber and the upper portions of the longitudinal partition walls embrace the upper header; wherein the water tubes in the convection chamber are vertically disposed and have their upper ends terminating at a level spaced a substantial distance below the upper header; and wherein groups of said vertically disposed convection-surface-forming tubes have their upper ends connected with the upper header by common trunk tubes, said trunk tubes being relatively widely spaced apart to facilitate access to the convection-surface-forming tubes.

5. The water tube boiler of claim 4, wherein the upper header is a steam drum, and wherein the upper portions of the longitudinal partition walls slope outwardly away from the steam drum so as to provide good access to the top of the convection chamber despite a relatively large transverse dimension for the steam drum.

6. The water tube boiler of claim 4, further characterized by a pan below the convection chamber to receive and accumulate cleansing liquid projecting against the convection-surface-forming tubes; and the top exterior wall of the boiler enclosure being formed to provide access openings therethrough above the convection chamber and at each side of the upper header, through which streams of cleansing liquid may be projected against the convection surfaces.

7. The water tube boiler of claim 6, wherein said access openings in the top exterior wall have edges parallel to and spaced from the adjacent surfaces of the upper header, and wherein the upper edges of the longitudinal partition walls join the top exterior wall substantially at said edges, so that said access openings provide the outlet means from the convection chamber.

8. The water tube boiler of claim 7, wherein the upper header is a steam drum and wherein the upper portions of the longitudinal partition walls slope outwardly away from the steam drum so that said access openings may be of relatively ample size while at the same time said longitudinal partition walls may be spaced apart a distance not much greater than the transverse dimension of the steam drum.

9. The water tube boiler of claim 3, wherein the side, top and bottom exterior walls are formed essentially of rows of opposing U-shaped tubes having upper and lower legs which are respectively connected at the ends thereof with the upper and lower headers.

10. The water tube boiler of claim 3, wherein adjacent ones of the tubes which form the exterior walls of the boiler enclosure are connected to one another by imperforate bridging webs, so that the exterior walls are gas tight.

11. The water tube boiler of claim 1, further characterized by a wall of water tubes dividing the combustion chamber into two side-by-side sections, all of said last-named tubes connecting the upper and lower headers to augment flow from header to header and thereby prevent overheating of the upper portion of the lower header.

12. The water tube boiler of claim 11, wherein the tubes of said wall which divides the combustion chamber are spaced from one another so that the two sections are communicated to enable equalization of pressure at opposite sides of said wall, and wherein the inlet means comprises a port leading to each section so that each section of the combustion chamber may be separately fired through its respective port.

13. The water tube boiler of claim 11, wherein the tubes comprising said wall which divides the combustion chamber have portions thereof embracing the underside of the upper header; and extended surface on said header embracing portions of the tubes, so that said portions of the tubes shield the underside of the upper header from the direct radiation rays in the combustion chamber.

References Cited by the Examiner

UNITED STATES PATENTS

| | | | |
|---|---|---|---|
| 2,149,477 | 3/1939 | Trede | 122—236 |
| 2,257,565 | 9/1941 | Lasker | 122—347 |
| 2,823,651 | 2/1958 | Marshall | 122—235 |
| 3,030,938 | 4/1962 | Vorkauf | 122—328 X |

FOREIGN PATENTS

| | | |
|---|---|---|
| 652,832 | 5/1951 | Great Britain. |
| 573,794 | 3/1958 | Italy. |

CHARLES J. MYHRE, *Primary Examiner.*